United States Patent [19]  [11] Patent Number: 5,201,216
Miyazaki et al.  [45] Date of Patent: Apr. 13, 1993

[54] AIR FLOW METER FOR INTERNAL COMBUSTION ENGINES AND A MANUFACTURING METHOD THEREOF

[75] Inventors: Atsushi Miyazaki; Chihiro Kobayashi, both of Katsuta; Yoshihito Sekine, Chiyoda; Nobukatsu Arai, Ushiku, all of Japan

[73] Assignee: Hitachi, Ltd., Tokyo, Japan

[21] Appl. No.: 668,066

[22] Filed: Mar. 12, 1991

[30] Foreign Application Priority Data

Mar. 12, 1990 [JP] Japan .................................. 2-57932
Nov. 30, 1990 [JP] Japan ................................. 2-329263

[51] Int. Cl.$^5$ .......................................... G01M 19/00
[52] U.S. Cl. .................................... 73/118.2
[58] Field of Search .............. 73/118.2, 202, 202.5; 29/595, 428, 469, 455.1, 889.21

[56] References Cited

U.S. PATENT DOCUMENTS 4,495,802 1/1985 Kashiwaya et al. ................ 73/202.5
4,887,577 12/1989 Arai et al. ........................... 73/118.2

FOREIGN PATENT DOCUMENTS 0074616 5/1982 Japan .................................. 73/118.2
0175918 10/1982 Japan .................................. 73/118.2

Primary Examiner—Robert Raevis
Attorney, Agent, or Firm—Antonelli, Terry, Stout & Kraus

[57] ABSTRACT

A detecting module for an air flow meter for internal combustion engines has an arm provided with a heat wire sensor at one end thereof and with a signal processing unit at the other end, and is provided with a predetermined constant length. A body member assembled with the detecting module is selected from among several varieties of body members produced for engines with different stroke volumes, each of which has an main air path formed by an axial bore having a diameter commensurate with the stroke volume. A bridging member formed across the axial bore which forms the main air path is provided therein with a by-pass path for by-passing a part of the airflow within the main air path and a communicating hollow portion for accommodating the arm. The body member is further provided with a mount for fixing the detecting module, thereon, the height of which is different in each variety of the body members, so that the heat wire sensor is always placed in a predetermined metering area within the by-pass path, irrespective of the diameter of the axial bore forming the main air path, when the arm is accommodated in the hollow portion.

10 Claims, 6 Drawing Sheets

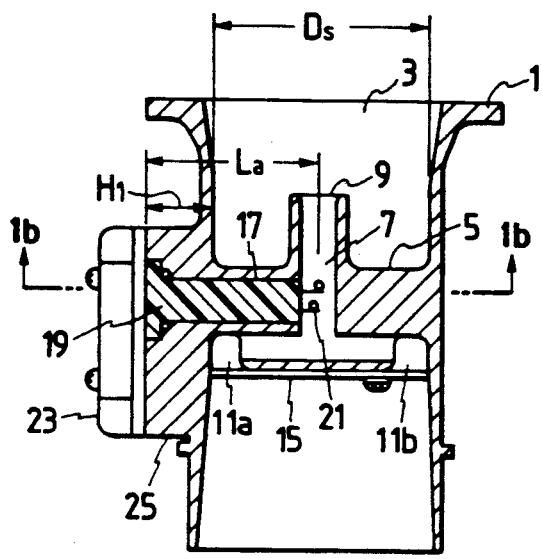
FIG. 1a
FIG. 1b
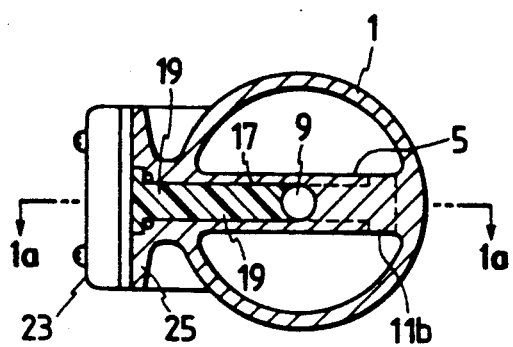
FIG. 2a
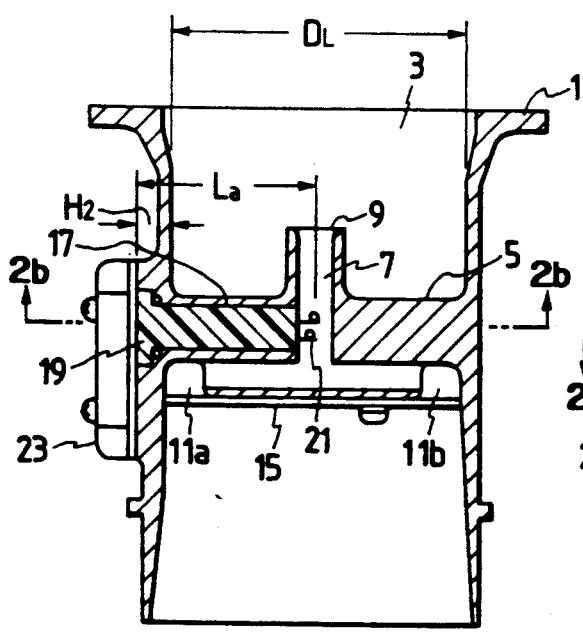
FIG. 2b
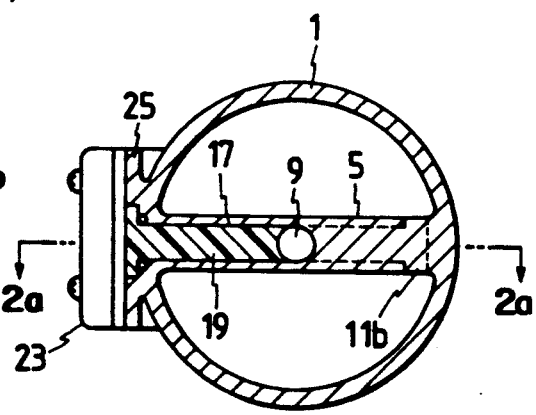

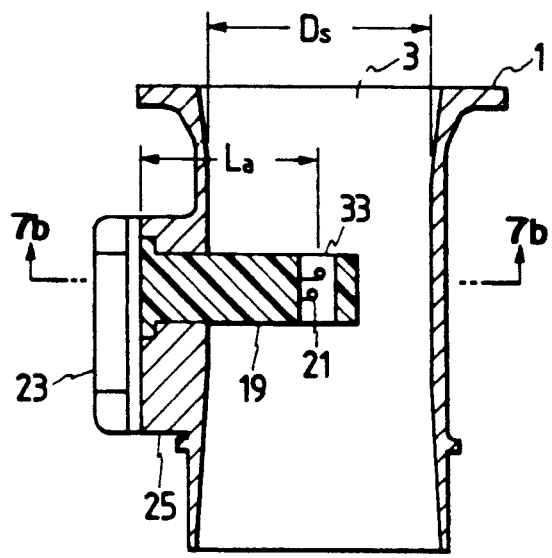
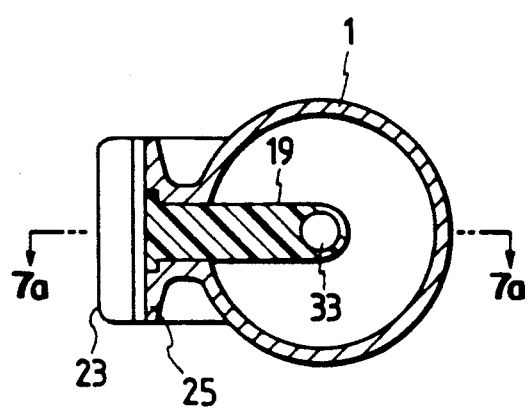
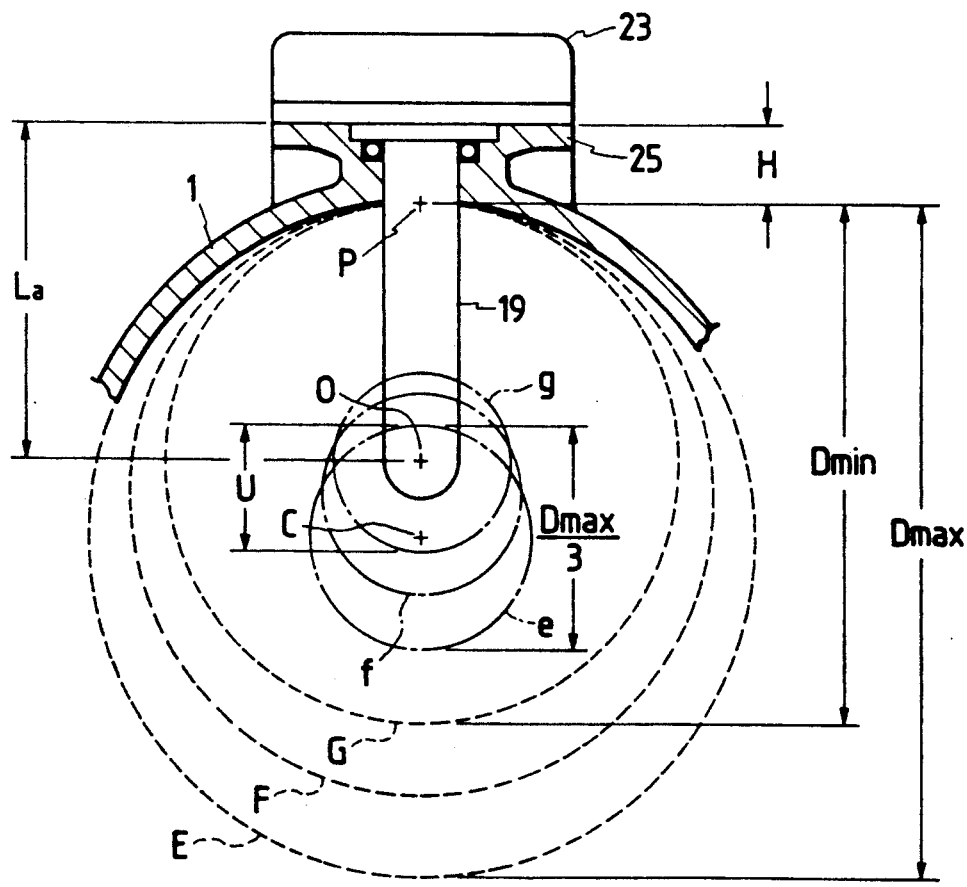

AIR FLOW METER FOR INTERNAL COMBUSTION ENGINES AND A MANUFACTURING METHOD THEREOF

BACKGROUND OF THE INVENTION

1. Field of the invention

The present invention relates to the improvement of an air flow meter for internal combustion engines and a manufacturing method thereof, and particularly to an improved air flow meter having a structural configuration which is suited for manufacture with a reduced manufacturing cost.

2. Description of the related art

As is well known, an internal combustion engine is equipped with an air flow meter for metering the amount of intake air supplied to the engine with a view toward attaining exhaust gas purification, economic fuel consumption and so on. Such an air flow meter is usually located in an appropriate portion of the suction system of the engine between the air cleaner and the throttle valve.

As a typical example, an air flow meter of this type is disclosed, for example, in the Nishimura et al U.S. Pat. No. 4,709,581, which is assigned to the same assignee as the present application. The Nishimura et al air flow meter comprises a body member, in which an air path having a certain bore is defined, and a metering element, such as a known heat wire sensor, which is located in an appropriate portion within the defined air path. The body member is, as mentioned above, equipped between an air cleaner and a throttle valve, so that the metering element meters the amount of intake air sucked into the internal combustion engine.

It is also known that an air flow meter is generally designed to provide the most suitable metering range of air flow rate from the point of view of metering accuracy, as well as the reliability and durability, of the air flow meter; i.e., the lower limit of the metering range is determined based on the required metering accuracy and the upper limit thereof depends on the expected reliability and durability of the flow meter.

On the other hand, the required amount of intake air to be supplied to an internal combustion engine differs to a large extent, depending on the stroke volume of the engine. If, therefore, the bore of an air path of an air flow meter is always constant irrespective of the stroke volume of the engine, the flow rate of the intake air flowing near the metering element of the flow meter will vary widely in accordance with the stroke volume of the engine. The change in the flow rate of the intake air may consequently exceed the lower or the upper limit of the aforesaid suitable metering range.

To prevent this, there have been produced several varieties of air flow meters for engines having different stroke volumes. In such air flow meters, an air path defined in the body member has a different bore in accordance with the stroke volume of the engine, to which the air flow meter is to be equipped, whereby the change in the flow rate of intake air flowing near the metering element is established within a suitable range as mentioned above. By way of example, the assignee of the present application has manufactured three or four varieties of air flow meters having bores between 60 mm and 80 mm for engines having a stroke volume of from one to five liters.

In such a case, however, a number of kinds of parts are required for assembling several varieties of air flow meters, so that the following inconvenience results. Firstly, the manufacturing cost of parts for air flow meters cannot be reduced sufficiently, because many kinds of parts to be used in relatively small amounts must be prepared. As a result, the total cost of manufacture of such an air flow meter could not be reduced sufficiently.

Further, there is another problem in the manufacturing process. Namely, since may kinds of parts are required for several varieties of air flow meters, assemblers are forced to pay careful attention to the correct selection of parts to be fitted for each type of meter and the proper assembly thereof. Consequently, there the good possibility to cause manufacturing errors as a result of false selection of parts and improper assembly of parts.

SUMMARY OF THE INVENTION

An object of the present invention is to provide an improved air flow meter having a structural configuration suited for manufacture with a reduced manufacturing cost and a manufacturing method thereof.

An air flow meter for an internal combustion engine has a detecting module with a metering element exposed to an intake airflow of the engine, a signal processing unit electrically coupled to the metering element for processing signals produced by the metering element to generate an output signal in response to the flow rate of the intake airflow, and an arm provided with the metering element at one end thereof and with the signal processing unit at the other end, through which electric connecting means. In accordance with the invention, the air flow meter further includes a body member, in which an air flow path for the intake air flow is defined, and which is assembled with the detecting module by inserting the arm thereof in a hole formed in a wall of the body member, whereby the one end of the arm is exposed to the airflow within the air path. There is further provided an attaching member interposed between the detecting module and the body member. The improvement according to the present invention resides in the fact that the arm of the detecting module has a predetermined constant length, and the body member is selected from among plural varieties of body members designed for internal combustion engines having different stroke volumes, wherein the length of the arm is determined so that the metering element is exposed to the air flowing in a predetermined metering area within the air path, irrespective of the selected body member, when the detecting module is assembled with the selected body member.

In the manufacture of the air flow meter according to the present invention, only one variety of detecting module is required for every variety of air flow meter. Accordingly, the mass production of detecting modules becomes possible, and therefore a detecting module can be manufactured at the low cost, which contributes to the reduction of the manufacturing cost of the air flow meter as a whole. Further, even when any variety of air flow meter is assembled, assemblers are not required to pay special attention to selection of an appropriate detecting module, which can reduce the possibility of mistake in assembling a detecting module and a body member.

BRIEF DESCRIPTION OF THE DRAWINGS

FIGS. 1a, 1b to 6a, 6b show sectional views of an air flow meter according to several embodiments of the present invention, in which the figures with suffix a show sectional views along the line A—A in the figures with suffix b, and vice versa;

FIGS. 7a and 7b show sectional views of an air flow meter according to still another embodiment of the present invention;

FIG. 11 is a diagram for explaining the principle for determining a suitable metering area within an air path.

DESCRIPTION OF THE PREFERRED EMBODIMENTS

Figure 3A:
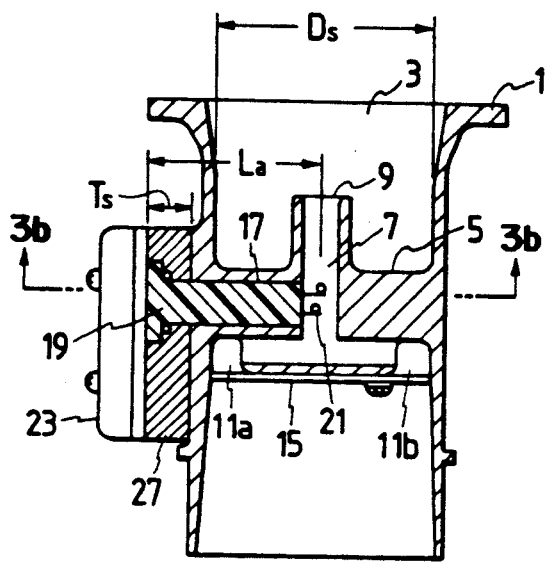

In the following, an airflow meter according to a first embodiment of the present invention will be described, referring to FIGS. 1a and 1b showing sectional views thereof.

As shown in the figures, main air path 3 with the bore $D_S$ is defined in body member 1 made by die-casting of aluminum. This body member 1 is equipped in an appropriate portion of a suction system of an internal combustion engine between an air cleaner and a throttle valve, so that intake air flows through the main air path 3. Bridging member 5, which extends across the bore of the main air path 3, is also die-casted integrally with the body member 1.

In the bridging member 5, there is formed a path 7 for by-passing part of the air flowing through the main air path 3. Air, which enters into the by-pass path 7 from its inlet 9, is branched into two flows on its way and is exhausted from two outlets 11a, 11b into the main air path 3 again. The outlets 11a, 11b are provided with a bottom plate 15, which prevents the blow-back of the engine from undesirably influencing the airflow within the by-pass path 7. In the bridging member 5, there is also formed a hollow portion 17, which communicates with the outside of the body member 1 through a hole provided in a wall of the body member 1. A part of a detecting module described below is inserted into the hollow portion 17 through the hole in the body wall.

The detecting module is composed of arm 19, metering element 21 attached on one end of the arm 19, and signal processing unit 23 attached on the other end of the arm 19. In FIG. 1a, the metering element 21 is shown as an element of the heat wire type, but the present invention has no limitation as to the type of metering element to be used. A metering element of such a known type in which a thin-film resistor is formed on a ceramic base plate can also be used. The signal processing unit 23 includes therein a circuit for processing signals from the metering element 21 to generate an output signal in response to the flow rate of airflow.

The arm 19 of the detecting module has such a length La that when the arm 19 is accommodated in the hollow portion 17 of the body member 1, the metering element 21 is placed at a predetermined metering point within the by-pass path 7 (in FIG. 1b, the metering element 21 is not shown for simplification of the drawing).

La in FIG. 1a is indicated as the length of the arm 19 including the metering element 21. However, since the metering element 21 is considerably small in size, compared with the arm 19, there is no substantial difference, whether La is represented either as the length of the arm including the metering element or as the arm's own length. In any event, the length of the arm itself can be determined on the basis the required length La and a known size of the metering element 21. More importantly, it is to be noted that, as will become apparent from the following explanation, the most significant aspect of the present invention is that the length La of the arm 19 is always constant, irrespective of the diameter of the bore $D_S$ of the main air path 3.

On the other hand, the body member 1 is provided with an attaching mount 25 on an outer wall thereof. The height $H_1$ of the mount 25, which is measured from the inner wall of the main air path 3, is determined in accordance with the diameter of the bore $D_S$ of the main air path 3, whereby the distance between an attaching surface of the amount 25 and the predetermined metering point within the by-pass path 7 can be almost equal to the length La of the arm 19. Namely, while there are manufactured several varieties of body members, having the different bore diameters, for engines with different stroke volumes, each variety of body member has the height of the attaching mount thereof adjusted to make the distance between the attaching surface of the mount and a predetermined metering point within by-pass path always equal to the length La of the arm of the detecting module.

FIGS. 2a and 2b shows an example of an air flow meter for engines having a larger stroke volume. In those figures, corresponding parts are indicated by the same reference numerals as in FIGS. 1a and 1b. The body member 1 of this example has a main air path 3, the bore $D_L$ of which is larger than the bore $D_S$ of the air flow meter shown in FIGS. 1a and 1b. Also in this case, however, the distance between the attaching surface of the mount 25 and the predetermined metering point within the by-pass path 7 is made equal to the length La of the arm 19 of the detecting module. To this end, the height $H_2$ of the mount 25, which is measured from the inner wall of the main air path 3, is smaller than the height $H_1$ in the case of FIGS. 1a and 1b. In this manner, the same detecting module can be used with various varieties of air flow meters for engines having different stroke volumes.

In the following, an actual example of the length La of an arm and the bore $D_S$ or $D_S$ of a main air path of a body member will be given. As already described, the assignee of the present application manufactures three or four varieties of air flow meters for engines having stroke volumes from one to five liters. Body members of those air flow meters have a main air path, the bore of which is from 60 mm to 80 mm. The length La of the arm of a common detecting module is 50 mm.

If, therefore, such a detecting module is assembled with body members having a main air path with a bore of 60 mm and the body members are provided with an attaching mount which is 70 mm high, the end of the arm of the detecting module, at which a metering element is provided, will be placed in almost the center of the main air path. Therefore, the by-pass path should be aligned with the center of the main air path. Further, if the detecting module is assembled with body members having a main air path with a bore of 70 mm or 80 mm, the body members should be provided with an attaching mount of 15 mm or 10 mm high, respectively, whereby a metering element end of the arm will be placed in almost the center of the main air path of the respective body members.

Figure 3B:
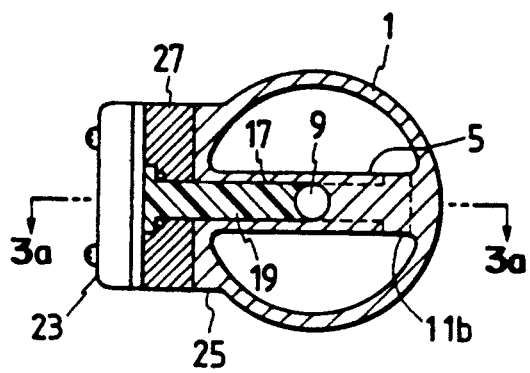

The function of an attaching mount as mentioned above can also be attained by a spacer interposed between an attaching mount and a casing of a signal processing unit. FIGS. 3a and 3b show sectional views of an air flow meter according to the present invention, in which such a spacer is used. In those figures, the same reference numerals denote corresponding parts in the respective figures.

In FIGS. 3a and 3b, spacer 27 is interposed between the mount 25 and the signal processing unit 23. In this case, the mount 25 is sufficient to provide a flat surface for fixing the spacer 27 thereon, and the distance between the attaching surface of the spacer 27 and a predetermined metering point within the by-pass path 7 can be adjusted by the thickness Ts of the spacer 27 so as to become equal to the length La of the arm 19. FIGS. 3a and 3b show the case where an air flow meter has a main air path with the bore $D_S$, however the same affect as mentioned above is provided in the case where an air flow meter has a main air path with a bore $D_L$, which is larger than $D_S$. Namely, the thickness Ts of the spacer 27 is determined in accordance with the bore of the main air path 3.

Further, it will be easily understood that the adjustment of the distance between an attaching surface of a detecting module and a predetermined metering point within a by-pass path can be effected by the combination of both the height of the attaching mount and the thickness of the spacer.

Moreover, the following will be understood from the aforesaid explanation concerning the length La of the arm 19. Namely, in the embodiments as shown in FIGS. 1a, 1b to 3a, 3b, the length La is conveniently determined on the basis of the maximum one of the bores of body members provided for various varieties of air flow meters, because if La is too long for a body member with a certain bore, the adjustment may be arbitrarily effected by selecting the height of the attaching mount or the thickness of the spacer.

Figure 4A:
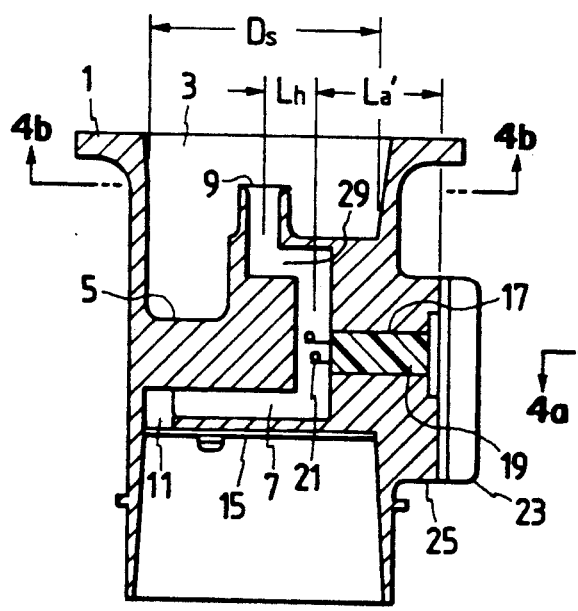
Figure 4B:
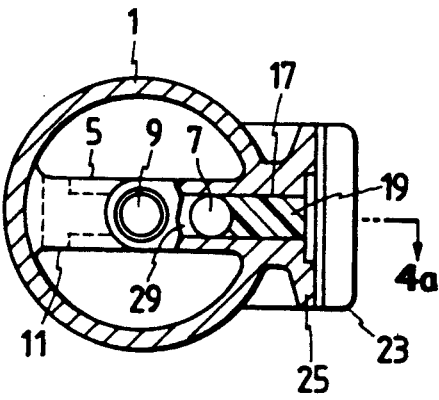

FIGS. 4a and 4b are sectional views of an air flow meter according to still another embodiment of the present invention. As apparent from the figures, the by-pass path 7 in this embodiment is bent in the bridging member 5 to have a horizontal portion 29, more generally, a portion almost parallel to the arm 19 accommodated in the hollow portion 17. With provision of this horizontal portion 29, the length of the arm 19 of the detecting module can be reduced to La', which is smaller than La as shown in the previous figures, while keeping the position of the inlet 9 of the by-pass path 7 at almost the center of the main air path 3.

Also in this embodiment, if the length Lh of the horizontal portion 29 in the by-pass path 7 is determined in accordance with the bore of the main air path 3, a detecting module having an arm 19, the length La' of which is always constant irrespective of the bore of the main air path 3, can be assembled with every variety of the body member 1.

Figure 5A:
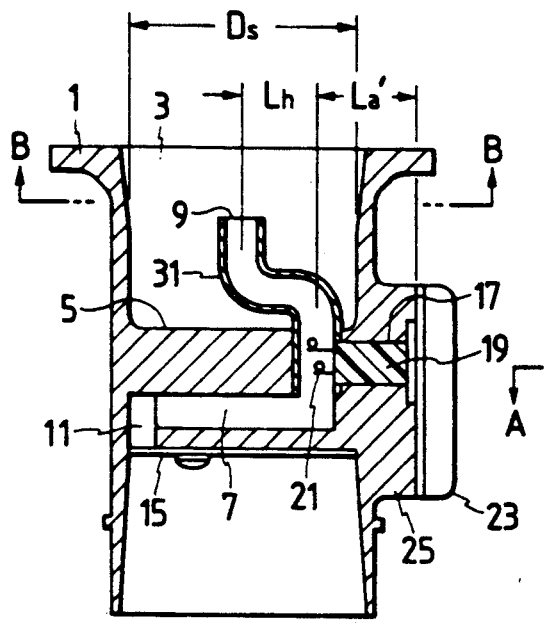
Figure 5B:
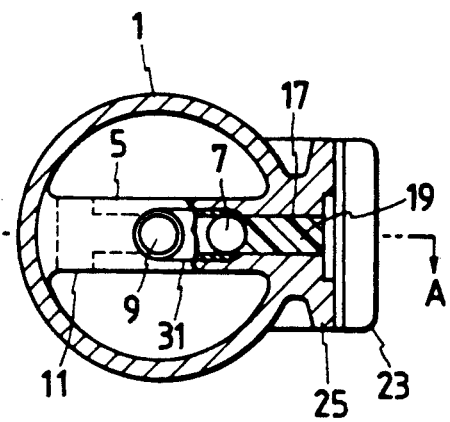

A modification of the embodiment of FIGS. 4a, 4b is shown in FIGS. 5a and 5b, in which the inlet side of the by-pass path 7 is formed by a curved pipe 31. This curved pipe 31 is inserted into a predetermined hole provided in the bridging member 5. This curved pipe 31 has a horizontal offset of a length Lh, so that the arm 19 in this modification can also be reduced to a length La', which is smaller than La. According to this modification, the manufacture of the body member 1 becomes simple, because the by-pass path does not have such a complicated configuration as in FIGS. 4a and 4b.

Figure 6A:
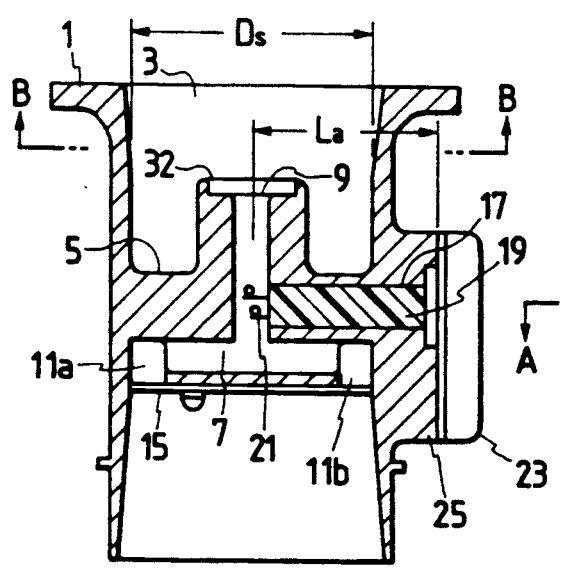
Figure 6B:
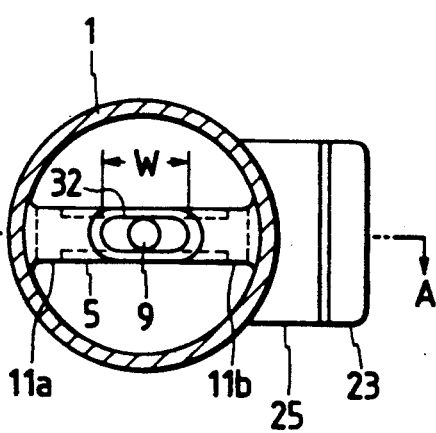

FIGS. 6a and 6b show sectional views of an air flow meter according to a further embodiment of the present invention, in which the inlet 9 of the by-pass path 7 has an opening 32 formed in an elliptical shape or in the shape of race track. The ellipse-shaped opening 32 has a width W in the direction of its long axis. The width W is determined to be within an area as described later in detail.

In this embodiment, the inlet 9 of the by-pass path 7 is put within the width W of the ellipse-shaped opening 32, whereby stable airflow suited for metering can be taken into the by-pass path 7. In addition, the distance between an attaching surface of the mount 25 and the metering point within the by-pass path 7 can be made equal to the length La of the arm 19 of the detecting module by locating the inlet 9 of the by-pass path 7 at an appropriate position within the width W of the ellipse-shaped opening 32 in accordance with the bore of the main air path 3 of the body member 1. With this expedient, the same effect as in the structure shown in FIGS. 4a, 4b and 5a, 5b is attainable.

In the embodiments as shown in FIGS. 4a, 4b to 6a, 6b, the length La' (or La) of the arm 19 is conveniently determined on the basis of the minimum one of the bores of body members designed for various varieties of air flow meters, contrary to those as shown in FIGS. 1a, 1b, 2a, 2b, 3a and 3b. In this case, the adaptive positioning of the metering element 21 can be effected by the length Lh of the horizontal portion of the by-pass path 7.

In all the embodiments as described above, a by-pass path, in which there exists a metering point, is formed within a main air path in order to obtain a stable airflow suitable for metering. If, however, airflow within a main air path is very stable or there is found an area of stable airflow at a particular location within a main air path, a by-pass path is not always necessary. FIGS. 7a and 7b show sectional views of an air flow meter in such a case.

As apparent from those figures, in this embodiment, the arm 19 of the detecting module has a small hole 33 at one end thereof, which opens toward both the upstream and the downstream directions of airflow within the main air path 3. In the hole 33, there is provided the metering element 21. Since the length of the hole 33 is considerably short in the direction of airflow, the hole 33 does not have the effect of rectifying unstable airflow to the extent that the by-pass path 7 has. Therefore, it can be said that the hole 33 is provided simply to protect the metering element 21 from mechanical damage. Since the arm 19 of the detecting module is inserted within the main air path 3 through a hole provided in a wall of the body member 1, the metering element 21 attached at one end of the arm 19 is directly exposed to the airflow within the main air path 3.

In the following, the behavior of the air flowing through the main air path will be discussed to find an area of stable airflow as mentioned above.

As is well known, there are usually included several curved portions in a suction pipe communicating with the main air path of an air flow meter from an air cleaner, because the suction pipe must be arranged in the engine compartment of an automobile, which compartment is not always wide sufficiently. It is also known that there occurs a disturbance in the airflow which passes through a curved portion, i.e. the flow velocity is varies over the section of a pipe just downstream of a curved portion.

Figure 8A:
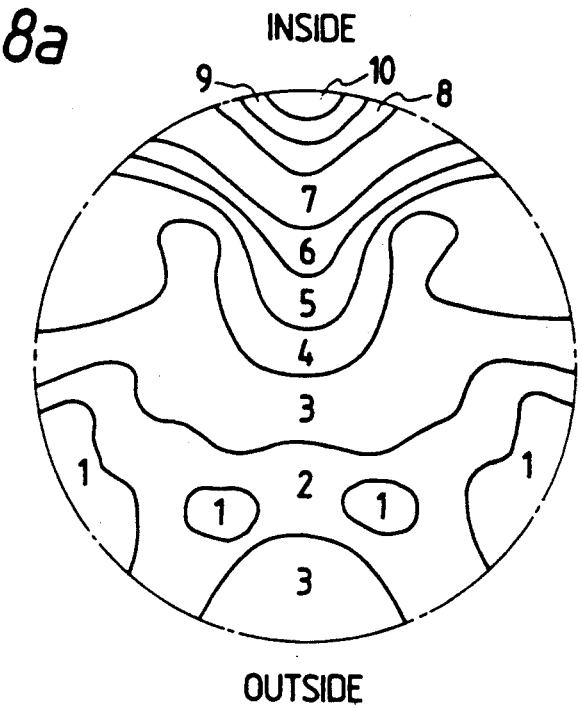
FIG. 8a is a chart showing the distribution, obtained by computer simulation, of partial flow rates within an air path just downstream of a curved passage in a bent element shown in front elevation and side section in FIG. 8b.
Figure 8B:
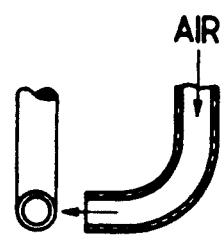
Figure 9A:
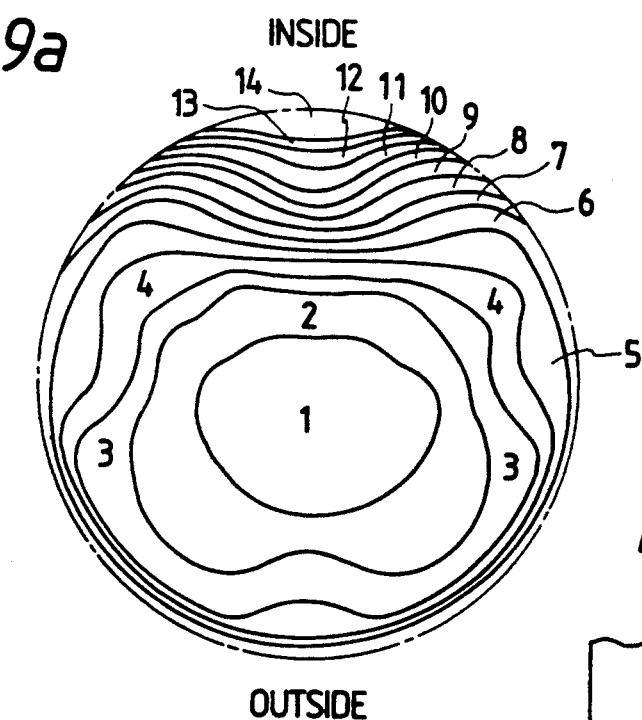
FIG. 9a is a chart showing the distribution, obtained by computer simulation, of partial flow rates within an air path just downstream of another type of a curved passage in a right-angled elbow shown in front elevation and side section in FIG. 9b.
Figure 9B:
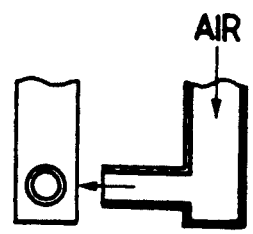

FIGS. 8a and 9a are charts representing the distributions of partial flow velocities in an airflow just downstream of a curved portion, which were obtained by computer simulation conducted by the inventors. FIG. 8a shows the distribution of partial flow velocities in airflow which has passed a bent element, as shown in FIG. 8b, and FIG. 9a shows the same in airflow which has passed through a right-angled elbow, as shown in FIG. 9b. In both the cases, the flow rate of air flowing through the pipe is 20 g/sec. Numerals surrounded by an iso-velocity line or lines represent the following flow velocity ranges in terms of m/sec.

In FIG. 8a:

| 1; | 4.4–4.2, |
| 2; | 4.2–4.0, |
| 3; | 4.0–3.8, |
| 4; | 3.8–3.6, |
| 5; | 3.6–3.4, |
| 6; | 3.4–3.2, |
| 7; | 3.2–3.0, |
| 8; | 3.0–2.8, |
| 9; | 2.8–2.6, |
| 10; | 2.6–2.4. |

In FIG.9a:

| 1; | 5.0–4.8, |
| 2; | 4.8–4.4, |
| 3; | 4.4–4.0, |
| 4; | 4.0–3.6, |
| 5; | 3.6–3.2, |
| 6; | 3.2–2.8, |
| 7; | 2.8–2.4, |
| 8; | 2.4–2.0, |
| 9; | 2.0–1.6, |
| 10; | 1.6–1.2, |
| 11; | 1.2–0.8, |
| 12; | 0.8–0.4, |
| 13; | 0.4–0.2, |
| 14; | 0.2–0. |

As apparent from those figures, the iso-velocity lines are dense in the inside of a curved portion (the upper side of the figures) and they are sparse at the outside thereof (the lower side of the figures). This means that the steep slope in the flow velocity change occurs in the inside of the curved portion, and on the other hand, the gentle slope occurs in the outside. Further, it can be understood that the neighborhood of the center axis of the airflow has a relatively stable flow velocity distribution.

A pipe of a suction system in an internal combustion engine usually includes plural curved pipe elements, such as bent elements or right-angled elbows as shown in FIGS. 8b and 9b, however a pipe element provided just upstream an air flow meter has the most significant influence on the metering of the airflow by the air flow meter. In the case, therefore, where the layout of pipes of a suction system is not known in advance or an air flow meter must be used for engines having wide varieties of pipe layouts in a suction system, the air flow meter is preferably designed to be capable of metering the flow rate in the neighborhood of the center axis of the airflow within a main air path thereof. In the following, the determination of the range of the metering area will be discussed on the basis of the computer simulation conducted by the inventors.

Figure 10A:
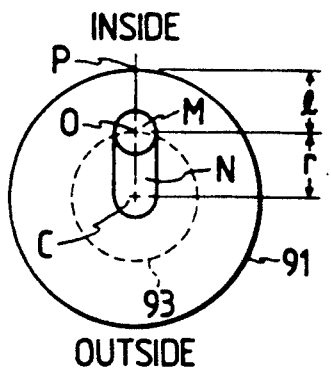
FIGS. 10a to 10c are diagrams for explaining the assumption and the result of the computer-simulation for simulating the state of variation of flow rates in an air path, which is just downstream of the bent element as shown in FIG. 8b and the right-angled elbow as shown in FIG. 9b.

The simulation was conducted, taking account the following assumption. As shown in FIG. 10a, two kinds of inlets of a by-pass path, which are formed within a main air path denoted by solid circle 91, were assumed. Namely, one (M) of the inlets has an opening formed in a circular shape, as shown in FIGS. 1a, 1b to 5a, 5b, and the other inlet (N) has an opening formed in a shape of race track and includes the center C of the main air path 91, as shown in FIGS. 6a, 6b. However, in the inlets M, N of different shapes, the centers thereof were assumed to be both located at the point O, which is the center of the inlet M and the center of the upper half circle of the inlet N. Further, the inlets M, N are rotated with the center C of the main air path centered, as shown by circle 93 of broken line. The distance r of the center O of the inlets M, N from the center C of the main air path, i.e. the radius r of the rotation circle 93, is also changed.

Under the assumption as mentioned above, the flow velocities u of the airflow, which will be taken into the by-pass path through the respective inlets M, N, are simulated. It will be understood from the charts of FIGS. 8a and 9a that the flow velocities u vary, as the center O of the inlets M, N and the rotation radius r change. Then, there were calculated the rate of variation of the flow velocities at every location of the center O of the inlets M, N, which was compared with the flow velocity at a reference position of the center O of the inlets M, N. In this case, the reference point was set on the line connecting the center C of the main air path and the point P, which is the top of the inside of the curved portion. With the thus obtained variation rates with respect to every point on the rotation circle 93 with the radius r, there was calculated the deviation $\lambda r$ between the maximum variation rate and the minimum one. The foregoing is represented by the following formula;

$$\lambda r = \max\left(\frac{u_{\theta r} - u_{Or}}{u_{Or}}\right) - \min\left(\frac{u_{\theta r} - u_{)r}}{u_{Or}}\right)$$

wherein $u_{\theta r}$ represents an average flow velocity in the inlet of the by-pass path, when the inlet is rotated with the radius r and displaced by the angle a from the reference position ($0 < \theta \leq 360°$), and $u_{Or}$ represents the same, when the inlet is located at the reference position.

Figure 10B:
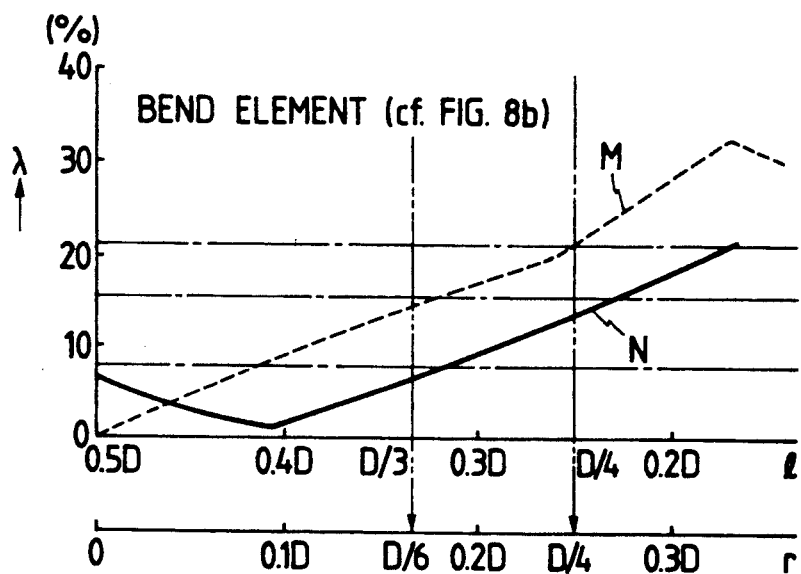
Figure 10C:
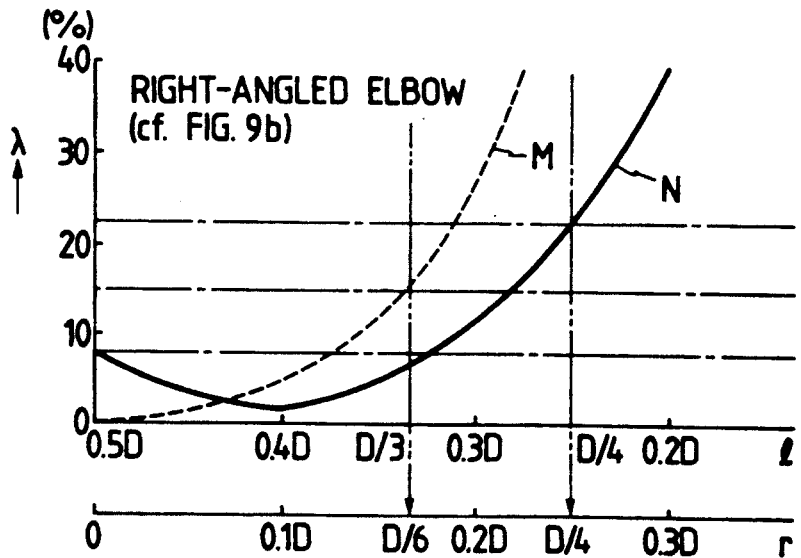

FIGS. 10b and 10c show the results of the simulation as mentioned above. FIG. 10b is the graph showing the result of the simulation conducted for the bent element as shown in FIG. 8b, and FIG. 10c is the same for the right-angled elbow as shown in FIG. 9b. Further, in both the figures, the broken line M indicates the simulation results for the inlet M with the circular shaped opening and the solid line N the simulation results for the inlet N with the race-track shaped opening. Abscissas in those figures are marked out by both the scale r measured from the center C of the main air path and the scale 1 measured from the top point P of the inside of the curved portion, both being represented in terms of the ratio to the bore D of the main air path.

In a conventional air flow meter, the upper limit of the allowable variation rate is about 20%. If the same allowable range of the variation rate is accepted in this case, it can be said from the graphs of FIGS. 10b and 10c that the distance r between the center O of the inlet of the by-pass path and the center C of the main air path can be D/4 at maximum, although there is an exception (cf. the broken line M in FIG. 10c). This means that the suitable metering area becomes a circular area of the radius D/4 (D/2 in its diameter) with the center C centered.

If a more stable flow velocity is required, for example, the variation rate is required to be smaller than 15%, the suitable metering area becomes a circular area of radius D/6 (D/3 in its diameter) with the center C centered. In that case, if the opening of the inlet is formed in a shape of race track, the variation rate is reduced to as small as about 8%. This means that a very stable airflow can be obtained.

From the foregoing, the determination of the metering area will be concluded as follows, which will be explained with reference to FIG. 11. In the figure, the same reference numerals denote corresponding parts as in the previous figures, and also the same symbols have the same meaning.

In FIG. 11, broken lines E, F and G indicate the inner surfaces of the main air paths with three varieties of bores, respectively, wherein the broken line E indicates the inner surface of the main air path of the maximum bore Dmax, the broken line G indicates the same for the main air path of the minimum bore Dmin, and the broken line F indicates the same for the main air path of a bore between the two above. These bores Dmax and Dmin depend on the varieties of air flow meters manufactured, which correspond to the bores of 80 mm and 60 mm in the air flow meters manufactured by the assignee of the present application, as already described.

Further, chain lines e, f and g in the figure indicate areas, each of which has the diameter of one third of the bore of the respective main air paths and in which the centers of the respective main air paths are centered for the corresponding areas. As already described., it is of course possible to determine these areas e, f, and g so as to make the diameter thereof equal to one half of the bore of the respective main air paths. When the bore of the main air path is E, F or G, a stable airflow can be obtained in the thus determined areas e, f and g, respectively. Therefore, the areas e,f and g are called suitable metering areas.

In FIG. 11, therefore, the area U, which is determined by the area e (its upper side in the figure) for the maximum bore Dmax and the area g (its lower side in the figure) for the minimum bore Dmin, can provide a stable airflow for every size of bore of the main air path. Inversely, if the end of the arm 19, at which the metering element is provided, is located in the aforesaid area U, a stable metering of the flow rate can be always realized. Based on this fact, the length La of the arm 19, which is available for every variety of the body member 1, can be determined.

As apparent from FIG. 11, in which suitable metering areas are assumed to be determined in accordance with the aforesaid one-third rule, since the upper side of the area e measured from the point P is represented by Dmax/3 and the lower side of the area g measured from the point P by 2Dmin/3, the appropriate length La of the arm 19 is represented as follows:

$$Dmax/3 \leq La \leq 2Dmin/3$$

Further, if suitable metering areas are determined in accordance with the aforesaid one-half rule, the same is represented as follows:

$$Dmax/4 \leq La \leq 3Dmin/4$$

The length La of the arm 19 in the embodiment shown in FIGS. 7a and 7b can be determined as above. However, it is to be noted that this principle can also be applied to the embodiments as shown in FIGS. 1a, 1b to 5a, 5b. In the cases of those embodiments, the position of the inlet 9 of the by-pass path 7 should be determined in accordance with the above principle. Also in the embodiment of FIGS. 6a and 6b, the width W of the opening 32 of the by-pass path 7 can be determined using the same principle.

We claim:

1. A method of manufacturing an air flow meter for an internal combustion engine comprising the steps of:
producing a single type of detecting module having a metering element to be exposed to an intake airflow of the engine, a signal processing unit, electrically coupled to the metering element, for processing signals produced by the metering element to generate an output signal in response to the flow rate of the intake airflow, and an arm provided with the metering element at one end thereof and with the signal processing unit at the other end, through which electric connecting means is provided for connecting said metering element to said signal processing unit;
producing plural varieties of body members for engines with the different stroke volumes, each of which body members comprises an axial bore defining an air path through which the intake airflow flows, the respective varieties of body members having axial bores of respectively different bore diameter in accordance with different stroke volumes of the engines, and a transverse bore extending from a hole in the wall of said body member and communicating with said axial bore;
selecting a body member having an axial bore with a bore diameter commensurate with the stroke volume of engine in which the air flow meter is to be used; and
assembling the detecting module with the selected body member, by securing said detecting module into said transverse bore in such a way that, considering the length of the arm of the detecting module and the diameter of the axial bore of the selected body member, the metering element is exposed to the air flowing in a predetermined metering area within the air path, irrespective of the variety of the selected body member.

2. A method according to claim 1, wherein said different varieties of body members are produced so as to have a mount for said detecting module formed integrally with an outer side wall of the body member, the height of the mount formed on each variety of body member being determined in accordance with the diameter of said axial bore forming the air path in the body member and the length of the arm.

3. A method according to claim 1, wherein said step of assembling includes inserting a spacer between said signal processing unit and said body member, which spacer has a thickness which is determined for each variety of body member in accordance with the diameter of said axial bore forming the air path in the body member and the length of the arm.

4. A method according to claim 1, wherein the predetermined metering area is an area which has a diameter smaller than D/2 and is centered in the air path, in which D is the diameter of said axial bore forming the air path.

5. A method according to claim 1, wherein the predetermined metering area is an area which has a diameter smaller than D/3 and is centered in the air path, in which D is the diameter of said axial bore forming the air path.

6. A method according to claim 1, wherein said body member has a transverse member projecting across the air path at almost a right angle to the direction of the airflow to be metered, which transverse member is formed with a by-pass path for by-passing part of airflow within the air path and a hollow portion for accommodating the arm inserted through the hole formed in the wall of said body member; wherein the one end of the arm is placed in a predetermined position within the by-pass path, when the arm is accommodated in the hollow portion; and wherein the by-pass path includes a portion lying substantially parallel to the arm accommodated in the hollow portion, the method further comprising the step of:

determining the length of said parallel portion of the by-pass path for each variety of body member so that the metering element carried on the one end of the arm is placed in said predetermined position within the by-pass path to accommodate the diameter of the axial bore forming the air path of the selected body member and the fixed length of the arm.

7. A method according to claim 1, wherein said body member has a transverse member projecting across the air path at almost a right angle to the direction of the airflow to be metered, which transverse member is formed with a by-pass path for by-passing part of airflow within the air path and a hollow portion for accommodating the arm inserted through the hole formed in the wall of said body member; wherein the one end of the arm is placed in a predetermined position within the by-pass path, when the arm is accommodated in the hollow portion; and wherein the by-pass path is formed at least in part by a pipe which is connected to a part of the projecting member and includes a portion bent so as to be substantially parallel to the arm accommodated in the hollow portion of said projecting member, the method further including the step of:

determining the length of said bent portion of said pipe for each variety of body member so that the metering element carried on the one end of the arm is placed in said predetermined position within the by-pass path to accommodate the diameter of the axial bore forming the air path of the selected body member and the fixed length of the arm.

8. A method according to claim 1, wherein said body member has a transverse member projecting across the air path at almost a right angle to the direction of the airflow to be metered, which transverse member is formed with a by-pass path for by-passing part of airflow within the air path and a hollow portion for accommodating the arm inserted through the hole formed in the wall of said body member; wherein the one end of the arm is placed in a predetermined position within the by-pass path, when the arm is accommodated in the hollow portion; and wherein an inlet of the by-pass path is formed in a shape of a race track, the length of which is included in the predetermined metering area, the method further comprising the step of:

locating the by-pass path within said inlet at a position such that the metering element carried on the one end of the arm is placed in said predetermined position to accommodate the diameter of the axial bore forming the air path of the selected body member and the fixed length of the arm.

9. A method for manufacturing an air flow meter for an internal combustion engine comprising the steps of:

producing plural varieties of body members, each variety having a different size axial bore defined in the body member and through which intake air flows;

selecting one from among the plural varieties of body members having a bore commensurate with the stroke volume of the engine for which the air flow meter is used;

producing a detecting module having a metering element exposed to intake airflow, a signal processing unit electrically coupled to the metering element for processing a signal from the metering element to generate an output signal in response to the flow rate of the intake airflow, and an arm having a constant length which is longer than Dmax/4 and shorter than 3Dmax/4, wherein Dmax is the largest one of the bores of the plural varieties of body members, which is provided with the metering element at one end thereof and with the signal processing unit at the other end, and through which electric connecting means is provided; and assembling the detecting module with the selected body member, including interposing an appropriate attaching member between the selected body member and the detecting module in accordance with the length of the arm, whereby one end of the arm is positioned in a predetermined metering area within the air path of the selected body member, irrespective of the bore of the selected body member, the metering area being determined by both the largest one and the smallest one among bores of air paths of the plural varieties of said body members.

10. A method of manufacturing an air flow meter for an internal combustion engine comprising the steps of:

producing plural varieties of body members, each having a different size bore defined in the body member and through which intake air flows;

selecting one from among the plural varieties of body members having a bore commensurate with the stroke volume of the engine for which the air flow meter is used;

producing a detecting module having a metering element exposed to intake airflow, a signal processing unit electrically coupled to the metering element for processing a signal from the metering element to generate an output signal in response to the flow rate of the intake airflow, and an arm having a constant length which is longer than Dmax/4 and shorter than 3Dmin/4, wherein Dmax and Dmin are the largest one and the smallest one of the bores of the plural varieties of body members, respectively, which is provided with the metering element at one end thereof and with the signal processing unit at the other end, and through which electric connecting means is provided; and assembling the detecting module with the selected body member, including interposing an appropriate attaching member between the selected body member and the detecting module in accordance with the predetermined length of the arm, whereby one end of the arm is positioned in a predetermined metering area within the air path of the selected body member, irrespective of the bore of the selected body member, the metering area being determined by both the largest one and the smallest one among bores of air paths of the plural varieties of body members.

* * * * *